Jan. 28, 1947.  L. D. MORELLE  2,414,970
CHAIN WELDING APPARATUS
Filed April 5, 1944  2 Sheets-Sheet 2
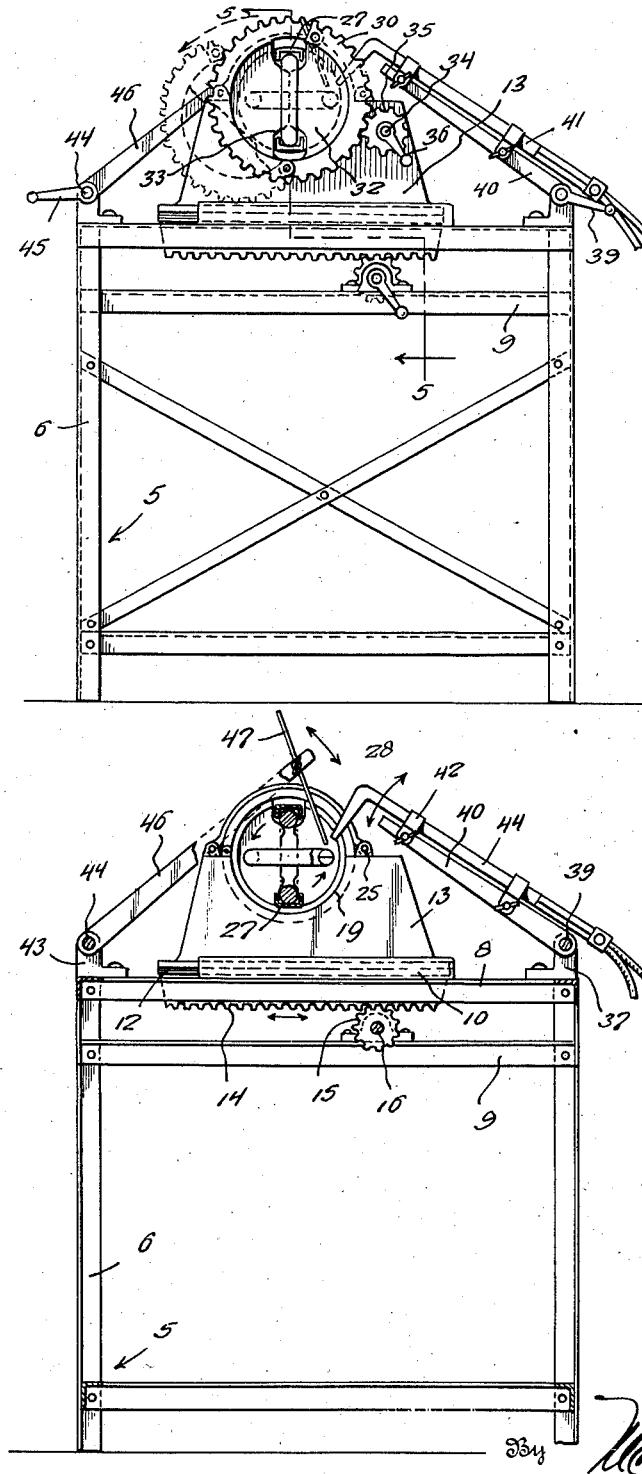
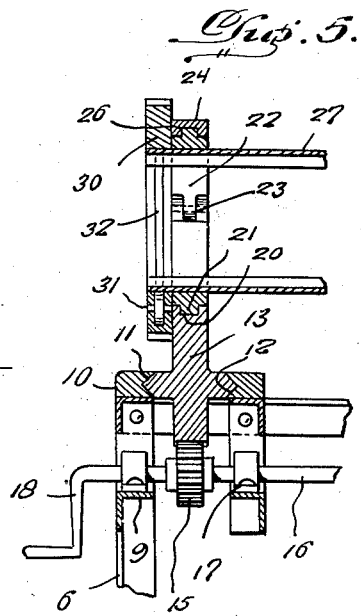
Inventor
Lionel D. Morelle,
By McMorrow and Berman
Attorneys Patented Jan. 28, 1947

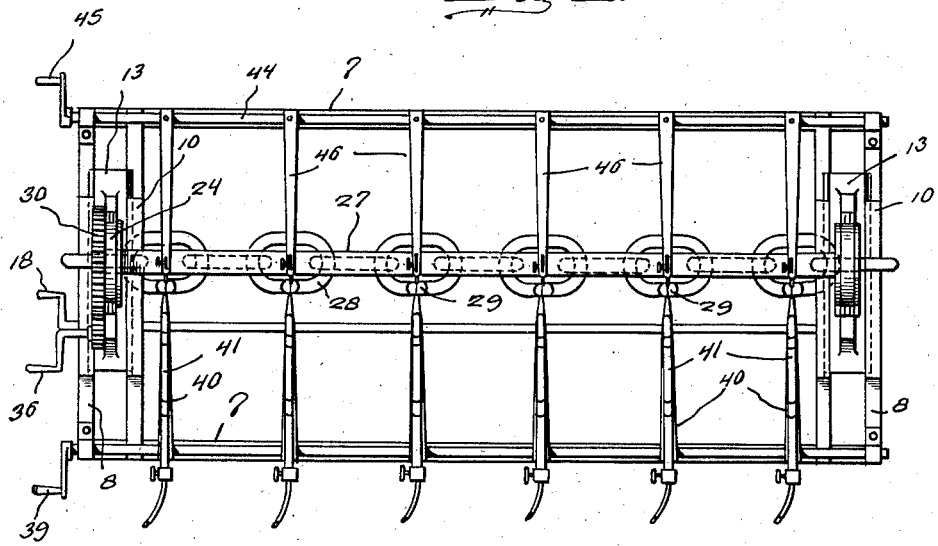
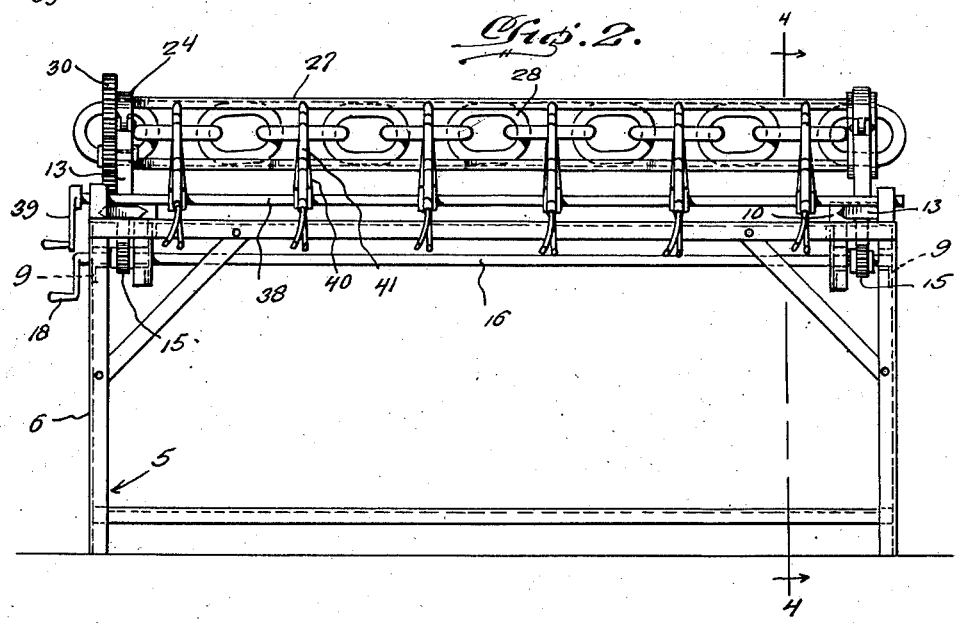

2,414,970

UNITED STATES PATENT OFFICE 2,414,970

CHAIN WELDING APPARATUS

Lionel D. Morelle, Shrewsbury, Mass.

Application April 5, 1944, Serial No. 529,692

4 Claims. (Cl. 59—31)

The present invention relates to an apparatus for welding the links of a chain and has for its primary object to provide means for rotatably holding the chain in position for simultaneously welding a plurality of links together with means for rotating the holder to properly position the links to be welded with respect to the welding torch and also embodying means for moving a battery of welding torches and welding sticks into position with respect to the several links of the chain.

A further important object of the invention is to provide a rotatable chain holding member embodying means for rotating the holder to bring the links into proper position with respect to the torch and also to provide means for moving the holder and the chain bodily so as to bring either side of the links of the chain into proper welding position.

An additional object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view.

Figure 3 is an end elevational view.

Figure 4 is a vertical sectional view taken substantially on a line 4—4 of Figure 2, and Figure 5 is an enlarged fragmentary sectional view taken substantially on a line 5—5 of Figure 3.

Referring now to the drawings in detail wherein for the purpose of illustration I have disclosed a preferred embodiment of the invention, the numeral 5 designates a frame or stand which includes upstanding corner posts 6, longitudinally extending frame members 7 and upper and lower spaced parallel transverse frame members 8 and 9, respectively, arranged at each end of the frame.

A pair of guides 10 are welded or otherwise secured to the upper transverse frame members 8, the opposed edges of the guides having grooves 11 formed therein of V-formation and adapted to receive the knife edges 12 formed on the opposite sides of a slide plate 13.

The lower edge of the plate 13 is formed with teeth 14 to constitute a rack bar which is engaged by a pinion 15 secured on a shaft 16 journaled in bearings 17 on the lower transverse frame member 5. A crank handle 18 is formed on one end of the shaft 16. One of the slides 13 and the operating pinion 15 therefor is positioned at each end of the frame.

The upper edge of the plate 13 is formed with a curved recess 19 having a channel 20 therein adapted for rotatably receiving an annular rib 21 formed on the peripheral edge of a transversely split ring 22, the sections of the ring being hingedly connected, as at 23.

An arcuate clamping member 24 extends over the upper edge of the ring 22, the ends of the clamping member being secured to the upper edge of the plate 13 by removable pins 25. The clamping member 24 is also formed with a groove 26 to rotatably receive the rib 21 of the ring, the clamping member 24 and the recess 19 in the upper edge of the plate 13 thus forming a bearing for the ring.

A channel member 27 is welded or otherwise fixedly secured to the inner periphery of the sections of the ring 22, the channel members being arranged at diametrically opposite sides of the ring and in opposed relation with respect to each other to receive the links of a chain 28 in the channels, the chain including links which are free of the channels and include a split edge 29 to be welded.

One end of the channel member 27 projects outwardly beyond the ring 22 and on the projected ends of the channels is a sectional gear 30 having its sections detachably connected by pins 31. Each section of the gear includes a web segment 32, the abutting edges of the webs having notches 33 therein to accommodate the channels 27.

The plate 13 at the front end of the machine has a shaft 34 journaled therein on which a pinion 35 is secured in engagement with the gear 30, the shaft 34 having an operating crank 36.

On the upper edge of the frame adjacent each end thereof and at one side of the frame are bearing brackets 37 in which a shaft 38 is rotatably supported, one end of the shaft having a handle 39 attached thereto. A plurality of arms 40 are secured at one end to the shaft and are adapted to swing inwardly toward the center of the frame. To each of the arms 40 is secured a welding torch 41 by means of clamping members 42.

At the opposite side of the frame and to the upper edge thereof are secured bearing brackets 43 in which a shaft 44 is rotatably mounted, one end of the shaft 44 having a handle 45 attached thereto.

A plurality of arms 46 are secured at one end to the shaft 44 and are likewise adapted to swing inwardly toward the center of the frame. To the inner ends of the arms 46 are secured welding sticks 47.

In the operation of the device one of the pins 31 of the gear 30 is removed to permit one section of the gear to swing upwardly into the dotted line position, as shown in Figure 3 of the drawings, and one end of the clamping member 24 is likewise released to permit the sections of the ring 22 to be swung open whereby to permit the placing of the chain 28 in the channels 27 with the links having the split edge 29 free of the channels. The ring 22, clamping member 24 and gear 30 are then closed and the arms 40 and 46 of the welding torches and welding sticks are then manipulated by the handles 39 and 45 to move the torches and welding sticks into proper position for welding the split side of the links.

The chain holder may be moved transversely of the frame by rotating the shaft 16 through the handle 18 and the pinion 15 and rack bar 14 to slide the plate 13 on the guide members 10.

The chain holder may also be rotated in the upper edge of the plate member 13 through the gear 30 and pinion 35 to thus bring the split edge of the links into proper welding position.

It is believed that the details of construction, operation and advantages of the device will be readily understood from the foregoing without further detailed explanation.

Having thus described the invention, what I claim is:

1. A chain welding apparatus comprising a frame, a slide at each end of the frame, means for moving the slide transversely of the frame, a chain holder rotatably mounted on the slides, and comprising a pair of channel members, adapted to receive links of a chain therein, sectional rings rotatably carried by the slides and to which the channel members are secured, means connected to the holder for rotating the same, and a battery of welding torches and welding sticks carried by the frame.

2. A chain welding apparatus comprising a frame, a slide at each end of the frame, means for moving the slide transversely of the frame, a chain holder rotatably mounted on the slides, and comprising a pair of channel members, adapted to receive links of a chain therein, sectional rings rotatably carried by the slides and to which the channel members are secured, a sectional gear connected to the channel members, means for operating the gear to rotate the holder, and a battery of welding torches and welding sticks carried by the frame.

3. A chain welding apparatus comprising a frame, a slide at each end of the frame, means for moving the slide transversely of the frame, a chain holder rotatably mounted on the slides, and comprising a pair of channel members, adapted to receive links of a chain therein, sectional rings rotatably carried by the slides and to which the channel members are secured, a sectional gear connected to the channel members, means for operating the gear to rotate the holder, a battery of welding torches and welding sticks, means for pivotally mounting the torches and sticks on the frame and means adjusting the positions of the torches and sticks relative to the chain.

4. In a chain welding machine comprising a frame, spaced parallel oppositely positioned channel elements arranged to receive a chain providing a chain holder, sectional rings in which said channel elements are mounted, sliders at opposite ends of the machine in which the sectional rings are rotatably mounted, means rotating the sectional rings in the sliders, means adjusting the positions of the sliders transversely of the machine, a battery of welding torches, means pivotally mounting the said welding torches in the machine, means adjusting the positions of the welding torches in relation to chain elements, a battery of welding sticks, means pivotally mounting said welding sticks in the machine, and means adjusting the positions of the welding sticks in relation to the positions of corresponding welding torches and chain elements.

LIONEL D. MORELLE.